(12) United States Patent
Muthiah

(10) Patent No.: US 12,182,439 B2
(45) Date of Patent: Dec. 31, 2024

(54) METADATA MANAGEMENT IN KEY VALUE DATA STORAGE DEVICE

(71) Applicant: Western Digital Technologies, Inc., San Jose, CA (US)

(72) Inventor: Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 143 days.

(21) Appl. No.: 17/903,131

(22) Filed: Sep. 6, 2022

(65) Prior Publication Data
US 2024/0078032 A1    Mar. 7, 2024

(51) Int. Cl.
G06F 3/00    (2006.01)
G06F 3/06    (2006.01)

(52) U.S. Cl.
CPC .......... *G06F 3/0652* (2013.01); *G06F 3/0607* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 10,437,481 B2 | 10/2019 | Tan et al. | |
| 10,705,974 B2 | 7/2020 | Qiu et al. | |
| 2013/0275391 A1* | 10/2013 | Batwara | G06F 16/125 707/689 |
| 2014/0215170 A1 | 7/2014 | Scarpino et al. | |
| 2017/0185619 A1* | 6/2017 | Choubey | G06F 16/172 |
| 2018/0123808 A1 | 5/2018 | Hung et al. | |
| 2019/0087130 A1 | 3/2019 | Lee et al. | |
| 2019/0243906 A1 | 8/2019 | Bisson et al. | |
| 2019/0258729 A1* | 8/2019 | Jeon | G06F 3/0679 |
| 2020/0225882 A1 | 7/2020 | Li | |
| 2020/0334292 A1 | 10/2020 | Ganeshan et al. | |
| 2022/0075523 A1 | 3/2022 | Muthukumaran et al. | |
| 2022/0164132 A1* | 5/2022 | Huang | G06F 3/0622 |
| 2023/0393761 A1* | 12/2023 | Bazarsky | G06F 3/0622 |

OTHER PUBLICATIONS

Rekha Pitchumani, et al., Hybrid Data Reliability for Emerging Key-Value Storage Devices, 2020, In 18th USENIX Conference on File and Storage Technologies, pp. 309-322.
John Kim and Bill Martin, The Key to Value: Understanding the NVMe Key-Value Standard, Live Webcast, Sep. 1, 2020, SNIA NSF, Networking Storage, 31 pp.

* cited by examiner

*Primary Examiner* — Midys Rojas
(74) *Attorney, Agent, or Firm* — PATTERSON + SHERIDAN, LLP

(57) ABSTRACT

A data storage device includes a memory device and a controller to the memory device. The controller is configured to receive key value (KV) pair data having a key and a value from a host device and generate a mapping in a key-to-physical (K2P) table corresponding to the received KV pair data. The mapping includes a first slot for storing a physical address corresponding to the value and a second slot for storing a physical address corresponding to metadata associated with the KV pair data. When the associated metadata is sent to the data storage device, which may be non-concurrent to transferring the KV pair data, the mapping of the associated metadata is linked to a same key as the mapping of the KV pair data. Thus, using the mapping, the key of the KV pair data is associated with the KV pair data and the associated metadata.

20 Claims, 6 Drawing Sheets

| COMMAND | DESCRIPTION |
|---|---|
| DELETE | DELETE THE KEY AND VALUE ASSOCIATED WITH SPECIFIED KEY |
| LIST | LISTS KEYS THAT EXIST IN A KEY VALUE NAMESPACE STARTING AT A SPECIFIED KEY |
| RETRIEVE | RETRIEVE THE VALUE ASSOCIATED WITH A SPECIFIED KEY |
| EXIST | RETURNS A STATUS INDICATING WHETHER A KEY VALUE EXISTS FOR A SPECIFIED KEY |
| STORE | STORES A KEY VALUE TO A KEY VALUE NAMESPACE |

| KEY 202 |
|---|
| VALUE 204 |

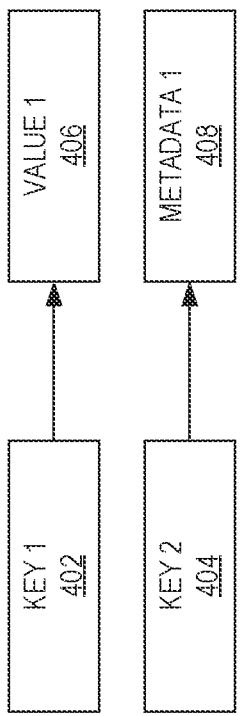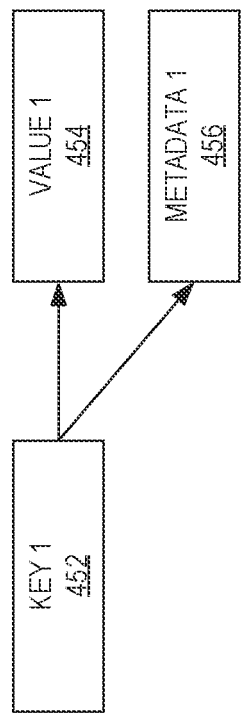
FIG. 4A
FIG. 4B

METADATA SLOT CREATION

KEY 1 – PHYSICAL ADDRESS OF VALUE 1, NULL
KEY 2 – PHYSICAL ADDRESS OF VALUE 2, NULL
...

FIG. 5A

ADDITION OF METADATA TO METADATA SLOT

KEY 1 – PHYSICAL ADDRESS OF VALUE 1, PHSYICAL ADDRESS OF METADATA 1
KEY 2 – PHYSICAL ADDRESS OF VALUE 2, PHYSICAL ADDRESS OF METADATA 2
...

FIG. 5B

METADATA MANAGEMENT IN KEY VALUE DATA STORAGE DEVICE

BACKGROUND OF THE DISCLOSURE

Field of the Disclosure

Embodiments of the present disclosure generally relate to data storage devices, such as solid state drives (SSDs), and, more specifically, optimizing storage of a key value pair data and its associated metadata in a data storage device.

Description of the Related Art

A KV database works by storing a quantity of user data that is associated with a key that is addressable as a complete entity. Examples of user data that can be stored in a KV database may include photos, records, and files. From a host device point-of-view, the photo, the record, or the file may be retrieved using a single key/address, rather than using multiple addresses that include data of the photo, the record, or the file. The data is stored as unstructured data and may be addressed using a key of variable length. Storage space of a memory device may be allocated for KV pair data in increments of bytes, where a length value of the KV pair data is associated with the necessary storage space to store the KV pair data.

Using a KV database in a data storage device may increase the performance of the data storage device. For example, the number of data transfers/second may be improved because the KV pair data to physical storage location translation layer in the host device may be removed. Furthermore, the number of commands over the bus may be reduced since an entire KV pair data may utilize a single transfer. However, metadata associated with the KV pair data may not be available for storage in the data storage device when the KV pair data is transferred to the data storage device. In other words, the metadata associated with the KV pair data may be generated after the KV pair data is programmed to the data storage device. When the metadata is transferred non-concurrently with the associated KV pair data, additional mappings are needed to address the metadata as well as associating the metadata to the KV pair data, which may increase latency when processing commands related to the KV pair data and associated metadata as well as require additional memory to store the additional mappings.

There is a need in the art for an optimized storage of mappings for KV pair data and associated metadata.

SUMMARY OF THE DISCLOSURE

The present disclosure generally relates to data storage devices, such as solid state drives (SSDs), and, more specifically, optimizing storage of a key value pair data and its associated metadata in a data storage device. A data storage device includes a memory device and a controller to the memory device. The controller is configured to receive key value (KV) pair data having a key and a value from a host device and generate a mapping in a key-to-physical (K2P) table corresponding to the received KV pair data. The mapping includes a first slot for storing a physical address corresponding to the value and a second slot for storing a physical address corresponding to metadata associated with the KV pair data. When the associated metadata is sent to the data storage device, which may be non-concurrent to transferring the KV pair data, the mapping of the associated metadata is linked to a same key as the mapping of the KV pair data. Thus, using the mapping, the key of the KV pair data is associated with the KV pair data and the associated metadata.

In one embodiment, a data storage device includes a memory device and a controller coupled to the memory device. The controller is configured to receive key value (KV) pair data and generate a mapping in a key-to-physical (K2P) table corresponding to the received KV pair data. The KV pair data includes a key and a value. The mapping includes a first slot for storing a physical address corresponding to the value of the received KV pair data and a second slot for storing a physical address corresponding to metadata associated with the received KV pair data. The metadata is stored independently of the value.

In another embodiment, a data storage device includes a memory device and a controller coupled to the memory device. The controller is configured to receive key value (KV) pair data, where the KV pair data includes a key and a value, store the value in the memory device, generate a mapping in a key-to-physical (K2P) table corresponding to the received KV pair data, where the mapping includes that stores a physical address of the value stored in the memory device, determine to double associate the key, and update the mapping to include a second slot based on the determining, where the second slot stores a physical address of metadata associated with the value that is stored in the memory device.

In another embodiment, a data storage device includes memory means and a controller coupled to the memory means. The controller is configured to process key value (KV) commands corresponding to KV pair data, where the KV pair data includes a key and a value, and maintain a key-to-physical (K2P) table. The K2P table includes one or more K2P entries. Each K2P entry includes a first slot and one or more second slots. The first slot stores a physical location of the value associated with the key corresponding to the K2P entry. The one or more second slots stores either a null value or a physical location of metadata associated with the value of the key corresponding to the K2P entry.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2A is an exemplary illustration of a KV pair data, according to certain embodiments.

FIG. 2B is a table illustrating a command set for a KV database, according to certain embodiments.

FIG. 4A is an exemplary illustration of a first key associated with a value and a second key associated with metadata associated with the value, according to previous embodiments.

FIG. 4B is an exemplary illustration of associating a first key with a value and metadata associated with the value, according to certain embodiments.

FIG. 5A is an exemplary illustration of generating a metadata slot in a mapping in a key-to-physical (K2P) table, according to certain embodiments.

FIG. 5B is an exemplary illustration of adding a physical location of metadata to a metadata slot in a mapping in a key-to-physical (K2P) table, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, optimizing storage of a key value pair data and its associated metadata in a data storage device. A data storage device includes a memory device and a controller to the memory device. The controller is configured to receive key value (KV) pair data having a key and a value from a host device and generate a mapping in a key-to-physical (K2P) table corresponding to the received KV pair data. The mapping includes a first slot for storing a physical address corresponding to the value and a second slot for storing a physical address corresponding to metadata associated with the KV pair data. When the associated metadata is sent to the data storage device, which may be non-concurrent to transferring the KV pair data, the mapping of the associated metadata is linked to a same key as the mapping of the KV pair data. Thus, using the mapping, the key of the KV pair data is associated with the KV pair data and the associated metadata.

Figure 1:
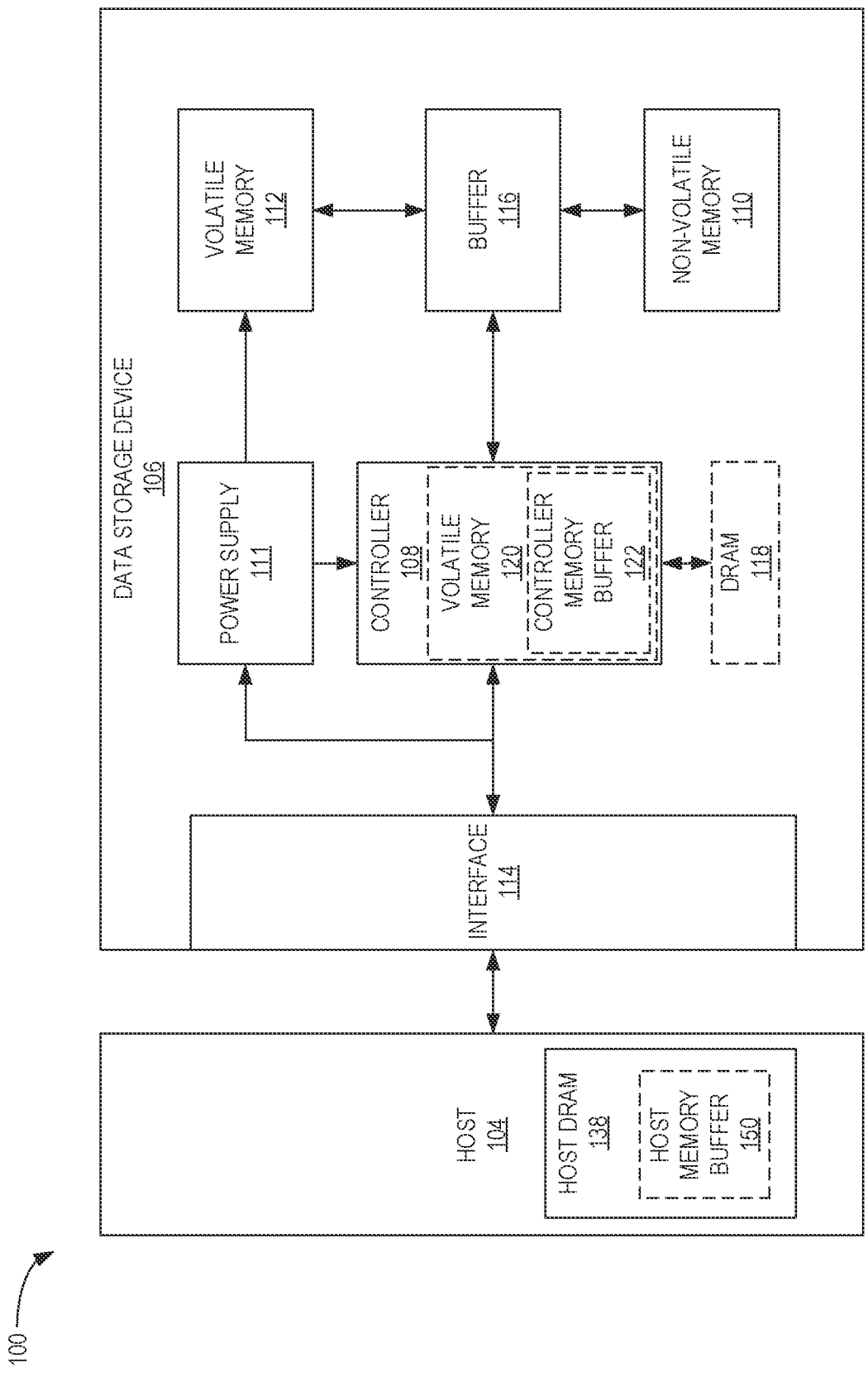
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

FIG. 2A is an exemplary illustration of a KV pair data 200, according to certain embodiments. KV pair data 200 includes a key 202 and a value 204, where the data, which may be host data, of the value 204 is addressed by the key 202. The key 202 may have a size of about 1 byte to about 64 bytes and the value 204 may have a size of about 0 bytes to about $2^{32}-1$ bytes. For example, when the value 204 has a size of about 0 bytes, the value 204 is an empty value. It is to be understood that the previously mentioned values are not intended to be limiting, but to provide an example of an embodiment. Because the value 204 may have a size greater than a physical wordline (e.g., greater than 16 KB), the value 204 may be divided across several wordlines and may result in misalignment. Misalignment may occur when partial data from multiple values are stored in a single wordline or when a portion of the value 204 is stored partially on a single wordline. Because misalignment of stored data may result in multiple reads, quality of service of a data storage device storing the misaligned data may be decreased and power consumption of the data storage device may be increased.

FIG. 2B is a table 250 illustrating a command set for a KV database, according to certain embodiments. For exemplary purposes, aspects of the storage system 100 of FIG. 1 may be referenced herein. A KV system may include a command set that includes, in a non-limiting list, a delete command, a list command, a retrieve command, an exist command, and a store command. The delete command may cause the controller 108 to delete the key 202 and value 204 associated with the key 202. The list command may cause the controller 108 to list keys that exist in a KV namespace starting at a specified key. The exist command may cause the controller 108 to return a status indicating whether a KV pair data 200 exists for a specified key to the command generator, such as the host device 104. The store command may cause the controller 108 to store a KV pair data to a KV namespace.

The retrieve command may cause the controller 108 to retrieve the value 204 associated with a specified key from a KV namespace. The length to be retrieved of the KV pair data 200 is specified in the retrieve command and the location to transfer the KV pair data 200 is specified by either a scatter gather list (SGL) pointer or a physical region page (PRP) pointer in the retrieve command. If the specified length in the retrieve command is less than the length of the KV pair data 200 that is being retrieved, then the controller 108 returns the requested amount and the length of the KV pair data 200 to the completion queue. However, if the specified length in the retrieve command is greater than the length of the KV pair data 200 that is being retrieved, then the controller 108 returns the data from the NVM 110 and the length of the KV pair data 200 is returned to the completion queue.

Figure 3:
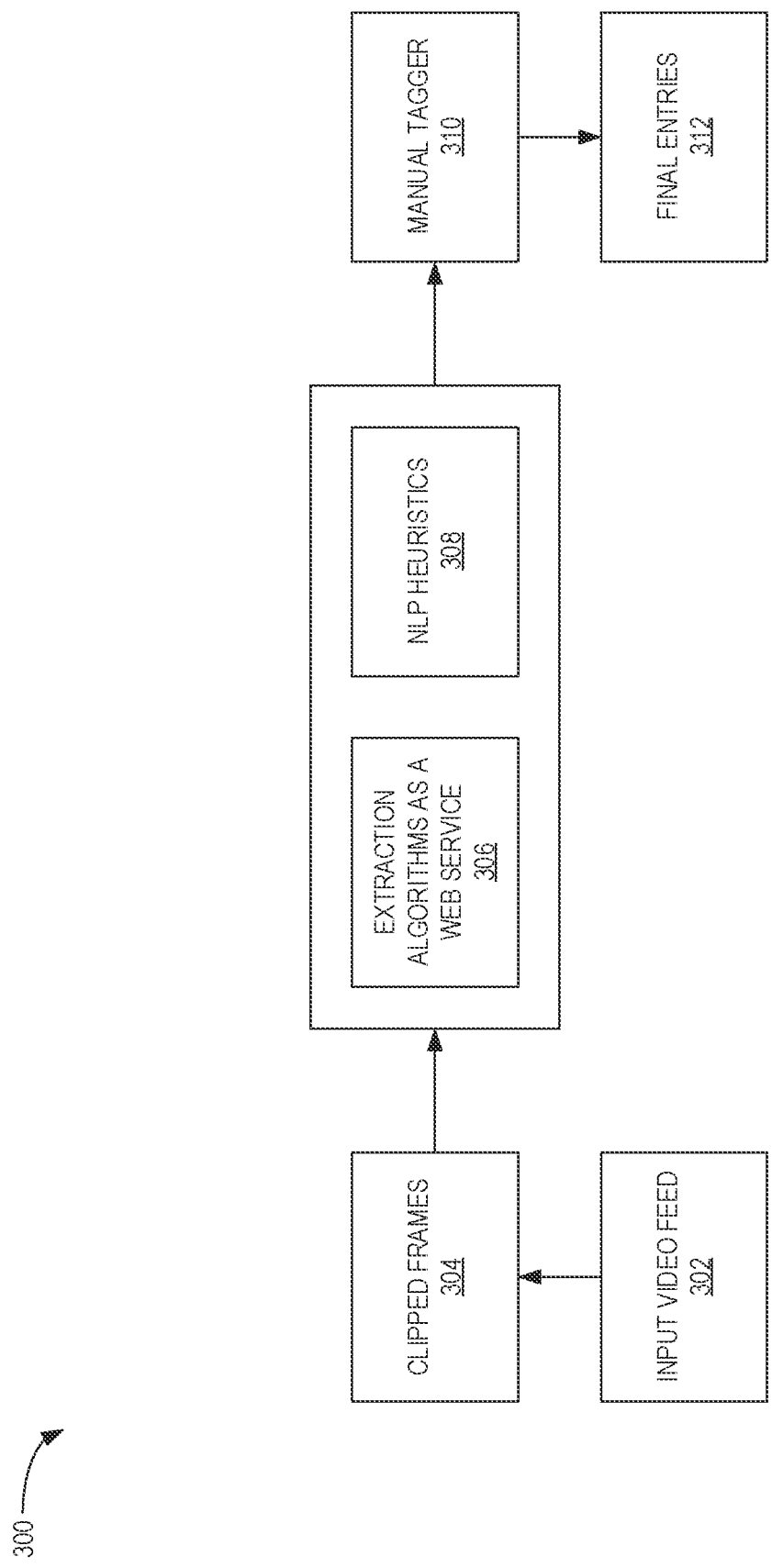
FIG. 3 is an exemplary flow diagram of processing a video, according to certain embodiments.

FIG. 3 is an exemplary flow diagram 300 of processing a video, according to certain embodiments. At block 302, input video feed is gathered. At block 304, frames of the input video feed are clipped. At block 306, extraction algorithms are performed on the clipped video frames to retrieve brand names, product names, and brand taglines in the input video feed. At block 308, the extracted data are ranked and classified based on a similarity using natural language process (NLP) heuristics. Blocks 306 and 308 are video processing steps that may be utilized to generate the metadata for the video feed. At block 310, the clipped video frames are tagged with the extracted data. At block 312, the final entries are outputted.

FIG. 4A is an exemplary illustration of a first key 402 associated with a value 406 and a second key 404 associated with metadata 408 associated with the value, according to previous embodiments. In many systems, metadata is generated from the content and tagged subsequently. In other words, the metadata may be generated after the data has been stored in the data storage device. For example, the metadata may need to be tagged to the data (or value in a KV system) in order to create an association between the data and the metadata. Referring to FIG. 4A, a data storage device, such as the data storage device 106 of FIG. 1, may store metadata 408 as another value (e.g., value 2) against another key (e.g., key 2 404) for data (e.g., value 1 406) that was previously stored against a key (e.g., key 1 402). Thus, a host device, such as the host device 104 of FIG. 1, overhead may be increased since the host device 104 may need to manage key mappings for one or more metadata that is associated with the value (e.g., value 1 406).

FIG. 4B is an exemplary illustration of associating a key 1 452 with a value 454 and metadata 456 associated with the value, according to certain embodiments. Rather than associating the metadata 456 with a second key, such as key 2 404 of FIG. 4A, the metadata 456 is associated with key 1 452. Thus, a single key (e.g., key 1 452) is used to map both the value 454 and the metadata 456 and may be addressable using the single key (e.g., key 1 452). Because a single key (e.g., key 1 452) is used to map both the value 454 and the metadata 456, the host device 104 overhead may be lower than the embodiments described in FIG. 4A. However, when metadata 456 is generated after the value 454 has been stored, conventional data storage devices may associate the metadata 456 with a second key, such as shown in FIG. 4A.

FIG. 5A is an exemplary illustration of generating a metadata slot in a mapping in a key-to-physical (K2P) table, according to certain embodiments. Aspects of the storage system 100 of FIG. 1 may be referenced herein for exemplary purposes. When KV pair data is received by the controller 108, the KV pair data is processed and programmed to the NVM 110. The physical address of the KV pair data in the NVM 110 may be stored in a K2P table, which may be stored in the NVM 110, the volatile memory 112, the second volatile memory 120, and the like. The K2P table maintains mappings of keys to a physical location of an associated value to the key in the NVM 110. For example, when the host device 104 sends a read command for a value stored in the NVM 110, the host device sends the relevant key to the controller 108 and the controller 108 utilizes the K2P table to determine where the relevant value is stored in the NVM 110.

The controller 108 may determine to create a double association policy (i.e., determine to create a "NULL" slot) in the K2P mapping during a KV store operation. In some examples, the controller 108 may generate additional "NULL" slots for additional metadata associated with the same value and same key. Furthermore, the controller 108 may dynamically determine to create a double association policy for the K2P mapping after the value has been stored to the NVM 110.

In some examples, the host device 104 may provide the controller 108 with a hint that indicates to the controller 108 whether or not metadata will be generated for the value. When the hint indicates that metadata will be generated by the host device 104 for the value, the controller 108 may generate the second slot in the relevant K2P table mapping to store the physical location of the metadata that will be stored in the NVM 110. However, because the metadata has not yet been generated yet, the second slot stores a "NULL" value in the second slot, as shown in FIG. 5B. Furthermore, the controller 108 may employ machine learning or any other relevant learning algorithms to determine to generate the second slot for received KV pair data. In other words, the controller 108 may pre-emptively generate the second slot without a host hint or without metadata associated with KV pair data being received.

FIG. 5B is an exemplary illustration of adding a physical location of metadata to a metadata slot in a mapping in a key-to-physical (K2P) table, according to certain embodiments. Aspects of the storage system 100 of FIG. 1 may be referenced herein for exemplary purposes. When metadata is received for a value of a KV pair data whose value is stored in the NVM 110, the controller 108 replaces the relevant "NULL" value in the second slot with the physical address of the metadata when the metadata is stored in the NVM 110. For example, if the metadata associated with the value that is associated with key 1 is stored in the NVM 110, then the "NULL" value in the mapping for key 1 is replaced with the physical address of the metadata.

Referring to FIG. 2A, the association of the metadata to a same key as the value may allow for more efficient operation of the data storage device. For example, by using the double association (e.g., associating the key with the value and the metadata in the same mapping), the host device may not need to maintain a separate table for the key association for data (e.g., value) and the key association for metadata. Likewise, because the key is associated with both the value and the metadata in the same K2P mapping, at least a portion of the value and/or at least a portion of the metadata may be retrieved separately or together using the same key. In cases where the metadata is generated and stored independently of the value (e.g., in a separate non-consecutive location of the NVM), the value and the metadata may be retrieved separately or together using the same key. Likewise, in a delete operation, the value and the metadata may be deleted together using the key rather than having to look up the associated metadata using a second key. In a KV list operation, the controller 108 may list all the keys and may optionally list the set of associations to each key, such as the associated value and the associated metadata.

Figure 6:
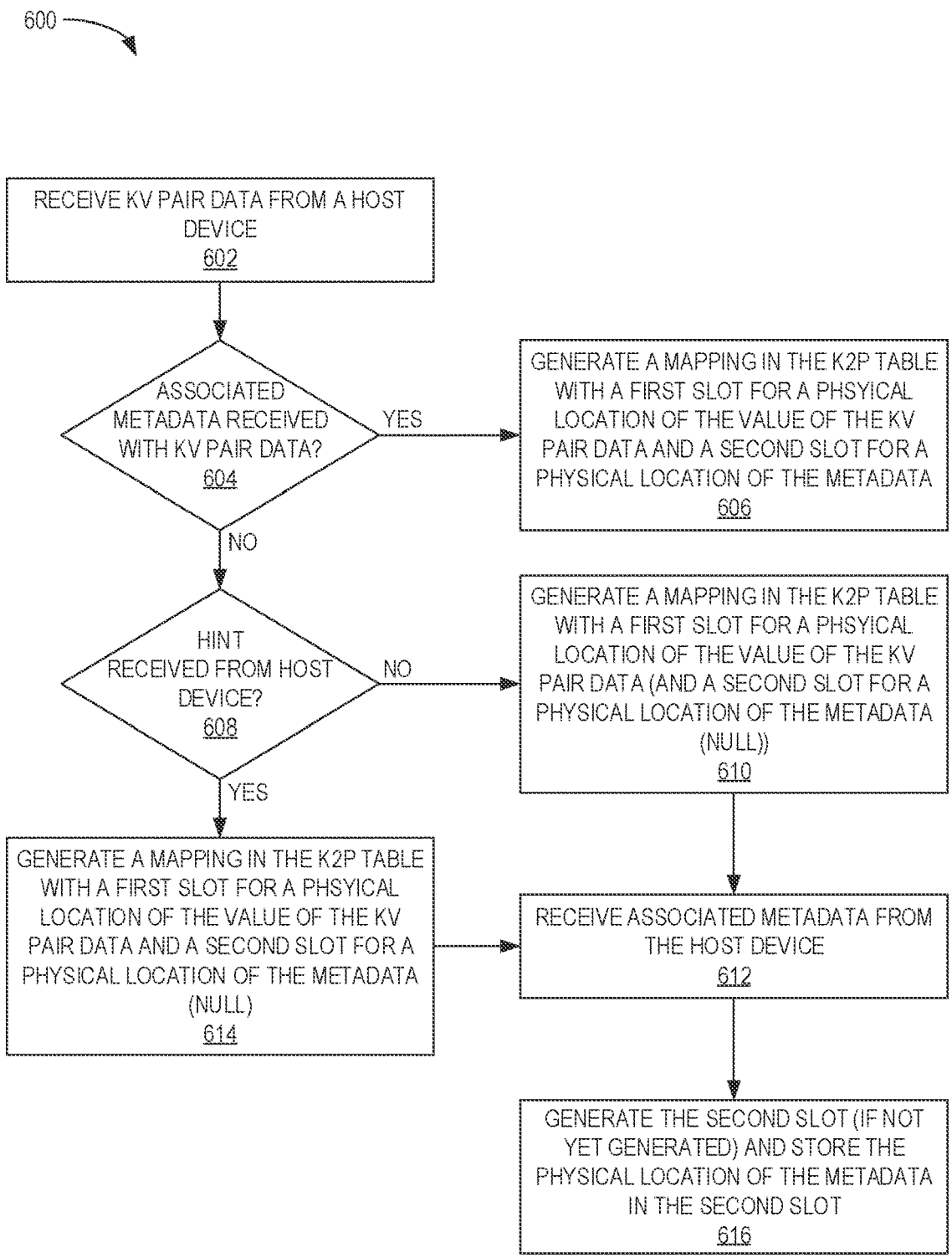
FIG. 6 is a flow diagram illustrating a method of mapping a value and associated metadata to a same key, according to certain embodiments.

FIG. 6 is a flow diagram illustrating a method 600 of mapping a value and associated metadata to a same key, according to certain embodiments. Method 600 may be implemented by a controller, such as the controller 108 of FIG. 1. Aspects of the storage system 100 of FIG. 1 may be referenced herein for exemplary purposes.

At block 602, the controller 108 receives KV pair data from the host device 104. At block 604, the controller 108 determines if metadata associated with the received KV pair data is received with the KV pair data. If the metadata associated with the received KV pair data is also received with the KV pair data at block 604, then the controller 108 generates and updates a mapping in the K2P table with a first slot storing the location of the value associated with the received KV pair data and a second slot storing the location of the metadata associated with received KV pair data at block 606. However, if the metadata associated with the received KV pair data is not received with the KV pair data at block 604, then the controller 108 determines if there has been a hint received from the host device corresponding to the received KV pair data at block 608.

If a hint has been received at block 608, then the controller 108 generates a mapping in the K2P table with a first slot storing the physical location of the value associated with the received KV pair data and a second slot storing a "NULL" value (to be replaced with the physical location of the metadata when the relevant metadata is received) at block 614. However, if a hint has not yet been received at block 608, then the controller 108 generates a mapping in the K2P table with a first slot storing the physical location of the value associated with the KV pair data at block 610. In some cases, the controller 108 may also generate a second slot storing a "NULL" value (to be replaced with the physical location of the metadata when the relevant metadata is received) at block 610 based on prior trends analyzed using machine learning.

At block 612, the controller 108 receives metadata associated with the received KV pair data from the host device. At block 616, the controller 108 generates the second slot to store the physical location of metadata (if the second slot has not yet been generated) stored in the NVM 110 or replaces the "NULL" value in the second slot with the physical location of the metadata stored in the NVM 110.

By double associating a key to the associated value and the associated metadata, computing systems utilizing key value architecture may be improved.

In one embodiment, a data storage device includes a memory device and a controller coupled to the memory device. The controller is configured to receive key value (KV) pair data and generate a mapping in a key-to-physical (K2P) table corresponding to the received KV pair data. The KV pair data includes a key and a value. The mapping includes a first slot for storing a physical address corresponding to the value of the received KV pair data and a second slot for storing a physical address corresponding to metadata associated with the received KV pair data. The metadata is stored independently of the value.

The controller is further configured to store a null value in the second slot when the metadata is not yet received. The controller is further configured to receive the metadata when the KV pair data from the host device. The controller is further configured to determine that the received metadata is associated with the key and update the second slot of the mapping based on the determining. The first slot and the second slot are updated concurrently. The mapping is associated with the key. The controller is further configured to receive the key from a host device, utilize the K2P table to determine the physical address of the value and the physical address of the metadata, and retrieve and provide to the host device either at least a portion of the value associated with the key, at least a portion of the metadata associated with the key, or combinations thereof. The controller is further configured to, in a KV delete operation, delete both the value and the metadata using the key. The metadata is not associated with a different key than the key.

In another embodiment, a data storage device includes a memory device and a controller coupled to the memory device. The controller is configured to receive key value (KV) pair data, where the KV pair data includes a key and a value, store the value in the memory device, generate a mapping in a key-to-physical (K2P) table corresponding to the received KV pair data, where the mapping includes that stores a physical address of the value stored in the memory device, determine to double associate the key, and update the mapping to include a second slot based on the determining, where the second slot stores a physical address of metadata associated with the value that is stored in the memory device.

A second mapping of the key to the metadata is not generated. The physical address of the metadata is non-consecutive to the physical address of the value. The controller is further configured to receive a hint from a host device. The hint comprises an indication of whether metadata will be generated. The controller is further configured to receive a KV delete command, wherein the KV delete command corresponds to the key, retrieve the mapping corresponding to the key from the K2P table, and delete both the value and the metadata based on the mapping. The physical address of the metadata is non-consecutive to the physical address of the value. The mapping includes two or more second slots. The determining occurs when the KV pair data is received. The determining occurs after a period of time has elapsed and the value of the KV pair data has been stored in the memory device.

In another embodiment, a data storage device includes memory means and a controller coupled to the memory means. The controller is configured to process key value (KV) commands corresponding to KV pair data, where the KV pair data includes a key and a value, and maintain a key-to-physical (K2P) table. The K2P table includes one or more K2P entries. Each K2P entry includes a first slot and one or more second slots. The first slot stores a physical location of the value associated with the key corresponding to the K2P entry. The one or more second slots stores either a null value or a physical location of metadata associated with the value of the key corresponding to the K2P entry.

The one or more second slots stores a null value when the K2P entry is generated and when the metadata is not stored in the memory means. The controller is further configured to update one of the one or more second slots to store the physical location of the metadata when the metadata is stored in the memory means.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
      receive key value (KV) pair data, wherein the KV pair data includes a key and a value;
      receive a hint that is distinct from the key, wherein the hint indicates whether or not metadata will be generated for the value; and
      generate a mapping in a key-to-physical (K2P) table corresponding to the received KV pair data, wherein the mapping comprises:
         a first slot for storing a physical address corresponding to the value of the received KV pair data; and
         a second slot for storing a physical address corresponding to metadata associated with the received KV pair data, wherein the metadata is stored independently of the value, wherein the metadata is received non-concurrently to receiving the KV pair data.

2. The data storage device of claim 1, wherein the controller is further configured to store a null value in the second slot when the metadata is not yet received.

3. The data storage device of claim 1, wherein the controller is further configured to receive the metadata when the KV pair data from a host device.

4. The data storage device of claim 3, wherein the controller is further configured to:
   determine that the received metadata is associated with the key; and
   update the second slot of the mapping based on the determining.

5. The data storage device of claim 1, wherein the first slot and the second slot are updated concurrently.

6. The data storage device of claim 1, wherein the mapping is associated with the key.

7. The data storage device of claim 1, wherein the controller is further configured to:
   receive the key from a host device;
   utilize the K2P table to determine the physical address of the value and the physical address of the metadata; and
   retrieve and provide to the host device either:
      at least a portion of the value associated with the key;
      at least a portion of the metadata associated with the key; or
      combinations thereof.

8. The data storage device of claim 1, wherein the controller is further configured to, in a KV delete operation, delete both the value and the metadata using the key.

9. The data storage device of claim 1, wherein the metadata is not associated with a different key than the key.

10. A data storage device, comprising:
    a memory device; and
    a controller coupled to the memory device, wherein the controller is configured to:
       receive key value (KV) pair data, wherein the KV pair data includes a key and a value;
       receive a hint that is distinct from the key, wherein the hint indicates whether or not metadata will be generated for the value;
       store the value in the memory device;
       generate a mapping in a key-to-physical (K2P) table corresponding to the received KV pair data, wherein the mapping comprises a first slot, wherein the first slot stores a physical address of the value stored in the memory device;
       determine to double associate the key; and
       update the mapping to include a second slot based on the determining, wherein the second slot stores a physical address of metadata associated with the value that is stored in the memory device, wherein a single key is used to map both the value and the metadata.

11. The data storage device of claim 10, wherein a second mapping of the key to the metadata is not generated.

12. The data storage device of claim 10, wherein the physical address of the metadata is non-consecutive to the physical address of the value.

13. The data storage device of claim 10, wherein the controller is further configured to receive the hint from a host device, and wherein the hint comprises an indication of whether metadata will be generated.

14. The data storage device of claim 10, wherein the controller is further configured to:
    receive a KV delete command, wherein the KV delete command corresponds to the key;
    retrieve the mapping corresponding to the key from the K2P table; and
    delete both the value and the metadata based on the mapping, wherein the physical address of the metadata is non-consecutive to the physical address of the value.

15. The data storage device of claim 10, wherein the mapping comprises two or more second slots.

16. The data storage device of claim 10, wherein the determining occurs when the KV pair data is received.

17. The data storage device of claim 10, wherein the determining occurs after a period of time has elapsed and the value of the KV pair data has been stored in the memory device.

18. A data storage device, comprising:
    memory means; and
    a controller coupled to the memory means, wherein the controller is configured to:

process key value (KV) commands corresponding to KV pair data, wherein the KV pair data includes a key and a value;

receive a hint that is distinct from the key, wherein the hint indicates whether or not metadata will be generated for the value; and maintain a key-to-physical (K2P) table, wherein:
- the K2P table comprises one or more K2P entries;
- each K2P entry includes a first slot and one or more second slots;
- the first slot stores a physical location of the value associated with the key corresponding to the K2P entry; and
- the one or more second slots stores either a null value or a physical location of metadata associated with the value of the key corresponding to the K2P entry, wherein the metadata is received non-concurrently to receiving the KV pair data.

19. The data storage device of claim 18, wherein the one or more second slots stores a null value when the K2P entry is generated and when the metadata is not stored in the memory means.

20. The data storage device of claim 19, wherein the controller is further configured to update one of the one or more second slots to store the physical location of the metadata when the metadata is stored in the memory means.

* * * * *